US012643676B1

(12) United States Patent  
Fielding et al.

(10) Patent No.: US 12,643,676 B1  
(45) Date of Patent: Jun. 2, 2026

(54) DOLLY FOR SUPPORT OF AIRCRAFT LANDING GEAR

(71) Applicant: Chase Supply Inc., Hampton, VA (US)

(72) Inventors: Fred M. Fielding, Mathews, VA (US); Nelson B. Franklin, Hampton, VA (US)

(73) Assignee: CHASE SUPPLY, INC., Hampton, VA (US)

( * ) Notice: Subject to any disclaimer, the term of this patent is extended or adjusted under 35 U.S.C. 154(b) by 0 days.

(21) Appl. No.: 19/091,142

(22) Filed: Mar. 26, 2025

(51) Int. Cl.  
*B64F 1/22* (2024.01)  
*B64F 1/227* (2024.01)

(52) U.S. Cl.  
CPC .................................... *B64F 1/227* (2013.01)

(58) Field of Classification Search  
CPC ...................................................... B64F 1/227  
See application file for complete search history.

(56) References Cited

U.S. PATENT DOCUMENTS

| | | | |
|---|---|---|---|
| 11,260,992 B1 | 3/2022 | Wiskus | |
| 11,540,960 B2 * | 1/2023 | Matheny | ................ A61G 5/066 |
| 12,103,708 B2 | 10/2024 | Wiskus | |
| 2014/0237820 A1 * | 8/2014 | Choi | ...................... F01D 25/285 |
| | | | 29/889.21 |
| 2020/0262496 A1 * | 8/2020 | Wilson | ................. A61G 12/001 |
| 2020/0298998 A1 * | 9/2020 | Rieser | ..................... F15B 11/20 |
| 2023/0160739 A1 * | 5/2023 | Nance | ................... G01M 1/125 |
| | | | 177/1 |
| 2023/0303267 A1 * | 9/2023 | Vidal Rojas | ............. B60P 3/11 |
| 2024/0417163 A1 * | 12/2024 | Binetti | ................... B65D 88/56 |

* cited by examiner

*Primary Examiner* — Saul Rodriguez  
*Assistant Examiner* — Ashley K Romano  
(74) *Attorney, Agent, or Firm* — Peter J. Van Bergen

(57) ABSTRACT

An aircraft dolly includes a plate having opposing mirror-imaged longitudinal sides. Each side includes a continuous first portion and a second portion of spaced-apart fingers contiguous with the first portion. A support disposed at each side of the plate includes a tube of triangular cross-section. The tube has a first leg, a second leg inboard of the first leg and coupled thereto, and a third leg consisting of the first portion of the plate extending between the first and second legs. Each support also includes a horizontal member coupled to the tube and extending over the plate's fingers, and a set of bracing members coupled to the fingers and the horizontal member. Casters are coupled to each horizontal member with each caster disposed between two adjacent fingers. One caster at each side is spring-biased away from its horizontal member. A ramp engages the plate and a ground surface.

21 Claims, 7 Drawing Sheets

DOLLY FOR SUPPORT OF AIRCRAFT LANDING GEAR

FIELD OF THE DISCLOSURE

This disclosure relates generally to a dolly, and more particularly to a dolly for manipulation on a ground surface and support of an aircraft landing gear.

BACKGROUND

Aircraft landing gears to include their tires are critical aircraft features that are subjected to substantial forces every time an aircraft lands. When a landing gear is damaged (e.g., flat tire, damaged strut, etc.), an aircraft is often unable to taxi to a safe location away from a landing zone. In addition, landing gears are typically configured to support straight-line movement of an aircraft such that additional equipment may be needed to maneuver an aircraft in constrained areas.

The above situations are generally addressed by aircraft maintenance personnel using a dolly that is capable of receiving and supporting an aircraft via its landing gear as well as being capable of movement on a ground surface to facilitate movement of the aircraft. Such dollies are necessarily heavy-duty pieces of equipment constructed of strong, rigid, and heavy materials thereby making a dolly difficult to maneuver even when it is not supporting an aircraft's landing gear. Furthermore, such aircraft dollies typically include winches that must be coupled to an aircraft landing gear and then operated to pull an aircraft onto the dolly. Such winches are necessarily heavy-duty devices that increase the overall weight, cost, and complexity of the dolly. Furthermore, in cases where a dolly requires a power unit (e.g., a battery) for operation, any failure of a winch's power unit adds another maintenance issue for personnel and inevitably increases the amount to time needed to move a disabled aircraft to a safe location which may greatly impact air traffic control issues.

SUMMARY

Accordingly, it is an object of the present disclosure to describe methods and systems for support of an aircraft's landing gear.

Another object of the present disclosure is to provide a dolly that is readily maneuvered to an aircraft.

Still another object of the present disclosure is to provide a dolly requiring no winches when loading an aircraft's landing gear thereon.

Yet another object of the present disclosure is to provide an aircraft dolly that is mechanically simple and strong, while also being configured for easy repair.

A still further object of the present disclosure is to provide an aircraft dolly configured to support simple offloading procedures.

Other objects and advantages of the methods and systems described herein will become more obvious hereinafter in the specification and drawings.

In accordance with methods and systems described herein, a dolly for support of an aircraft's landing gear includes a one-piece rigid and planar plate having opposing mirror-imaged longitudinal sides. Each side includes a first portion that is continuous and a second portion of spaced-apart fingers contiguous with the first portion. A longitudinal rigid support is disposed at each side of the plate. Each support includes a tube of triangular cross-section. The tube has a first leg extending along and rigidly coupled to the first portion of the plate, a second leg extending along and rigidly coupled to the first portion of the plate inboard of the first leg and rigidly coupled to the first leg, and a third leg consisting of the first portion extending between the first leg and the second leg. Each support also includes a horizontal member extending along and rigidly coupled to the tube with the horizontal member extending over the plate's fingers, and a set of bracing members with each bracing member rigidly coupled to one of the fingers and the horizontal member. A set of casters is coupled to each horizontal member with each one of the casters disposed between two adjacent fingers. One of the casters at each side is spring-biased away from the horizontal member associated therewith. A rigid ramp is operable to engage the plate and a ground surface.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

The aircraft dolly described herein may be readily manipulated on a ground surface (e.g., airport runway, soft ground regions adjacent to a runway, floor of a hangar, onboard a ship such as an aircraft carrier, etc.) with or without an aircraft's landing gear loaded onto the dolly. The aircraft dolly does not rely on the use of a winch when loading or unloading an aircraft's landing gear. Accordingly, the aircraft dolly described herein may be used in a variety of emergency maintenance and routine maintenance applications requiring support of an aircraft's landing gear to facilitate or aid movement of the aircraft on a ground surface.

In general, it is to be assumed herein that the materials used in constructing an aircraft dolly in accordance with the present disclosure are strong and rigid as would be understood in the art. While various types of metals (e.g., steel) and composites may be used for the aircraft dolly, it is to be understood that the choice of materials is not a limitation of the present invention.

Aircraft dolly 10 includes a one-piece plate 20, side supports 40 at opposing longitudinal sides of plate 20, caster wheels (or simply casters as they will be referred to hereinafter) 50 coupled to each of side supports 40, and a ramp 60 that is attachable at one end of plate 20 and side supports 40. Each of these components or subassemblies will be described further below with reference to one or more of FIGS. 1-5.

Figure 1:
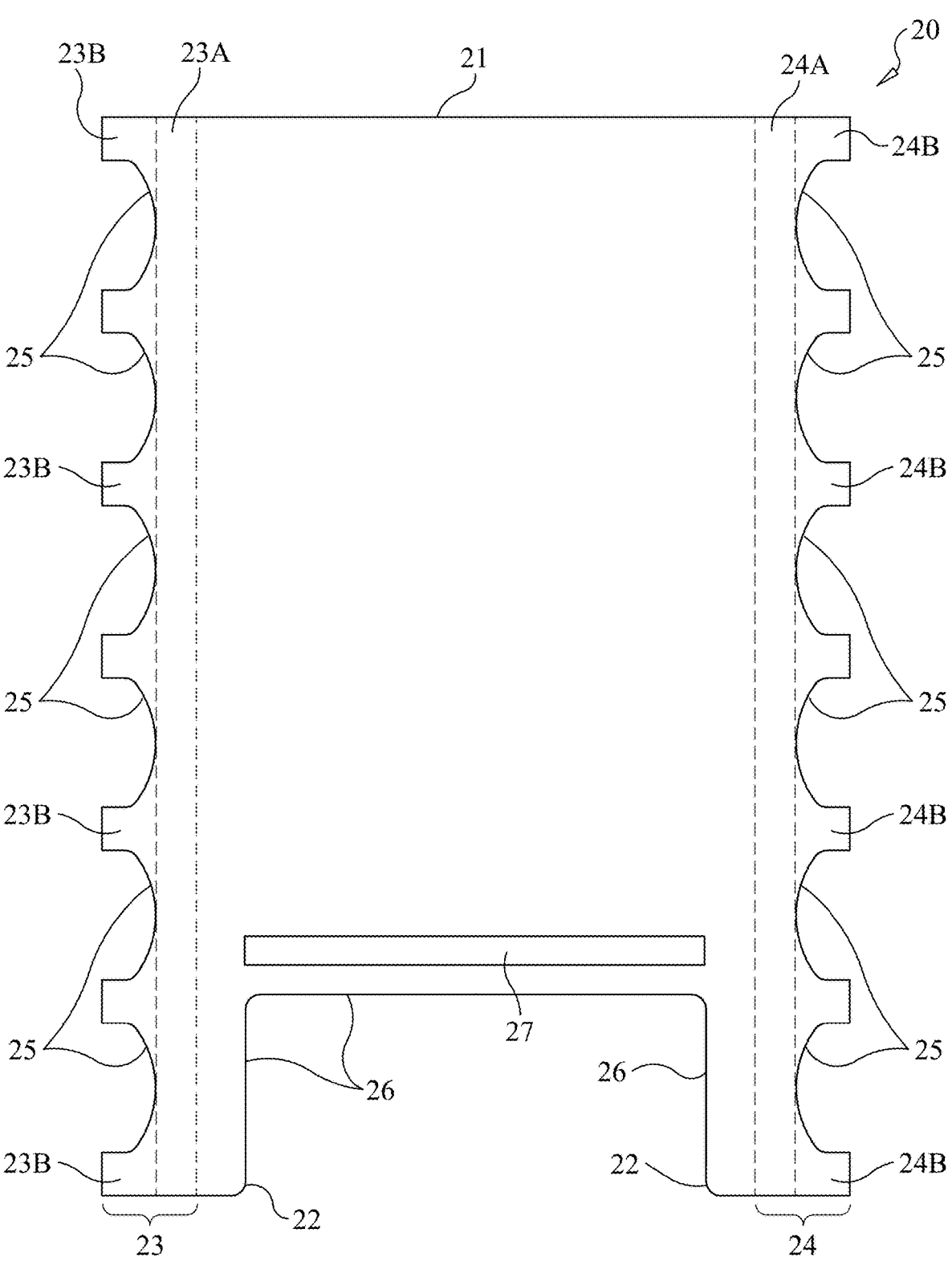
FIG. 1 is an isolated plan view of one embodiment of a plate for an aircraft dolly in accordance with various aspects as described herein.

Plate 20 is a rigid and planar piece of stock material (e.g., steel) having features that are best illustrated in FIG. 1. Plate 20 is elongate and generally rectangular with one end 21 that will be located at the towing end of dolly 10 and an opposing end 22 that will be located at the loading/unloading end of dolly 10. Dolly 10 has a series or set of mirror-image cutouts 25 along each of opposing longitudinal sides 23 and 24 of plate 20. More specifically, each of longitudinal sides 23/24 includes a respective continuous portion 23A/24A extending between opposing ends 21 and 22, and a set of respective spaced-apart fingers 23B/24B contiguous with respective portions 23A/24A. Each of cutouts 25 may be adjusted in size and shape to accommodate the type or size of casters 50 that will be included with dolly 10. For example, the shapes of cutout may be semi-circular, rectangular, or a combination of geometric shapes without departing from the scope of the present disclosure. The shapes of cutouts 25 may also be different along sides 23/24 without departing from the scope of the present disclosure. Still further, the sizes of cutouts 25 may be the same or different for each of sides 23/24 without departing from the scope of the present disclosure. For example, in some embodiments employing the use of one or more swiveling casters and one or more non-swiveling (or fixed) casters at each side of plate 20, the cutouts for the swiveling casters may be larger than the cutouts for the non-swiveling casters.

Figure 4:
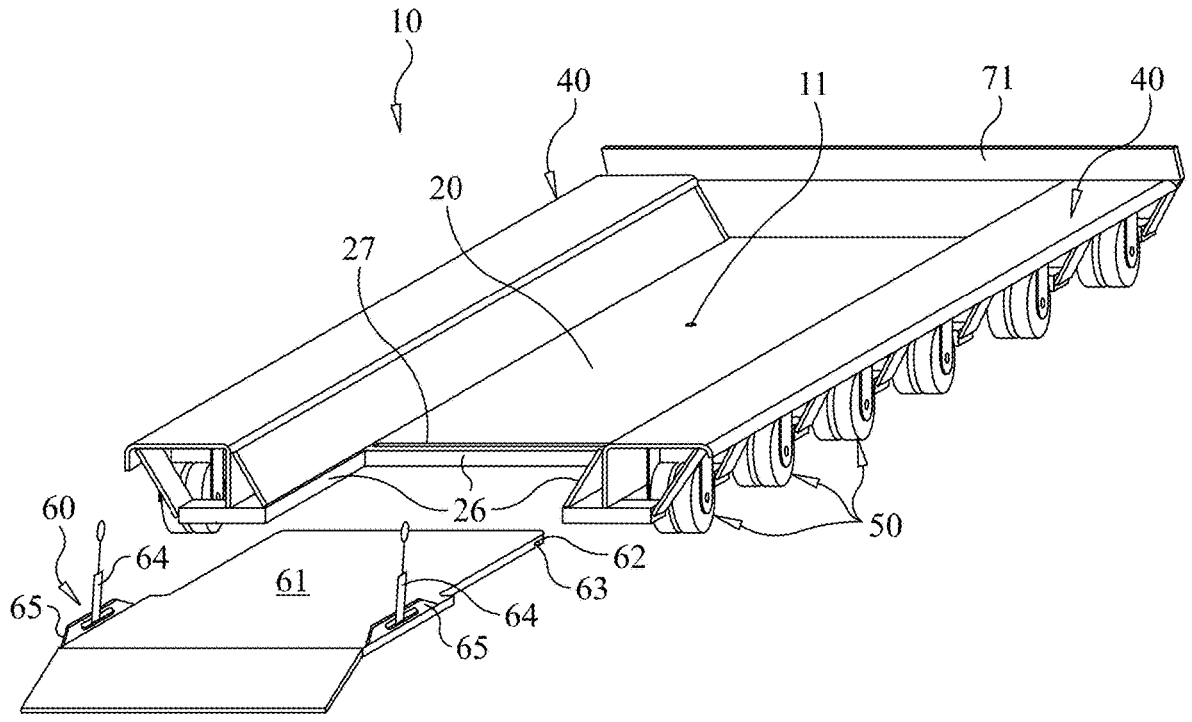
FIG. 4 is a perspective view of an embodiment of an aircraft dolly illustrated from the loading end thereof with its ramp unconnected from the dolly's plate in accordance with various aspects as described herein.
Figure 5:
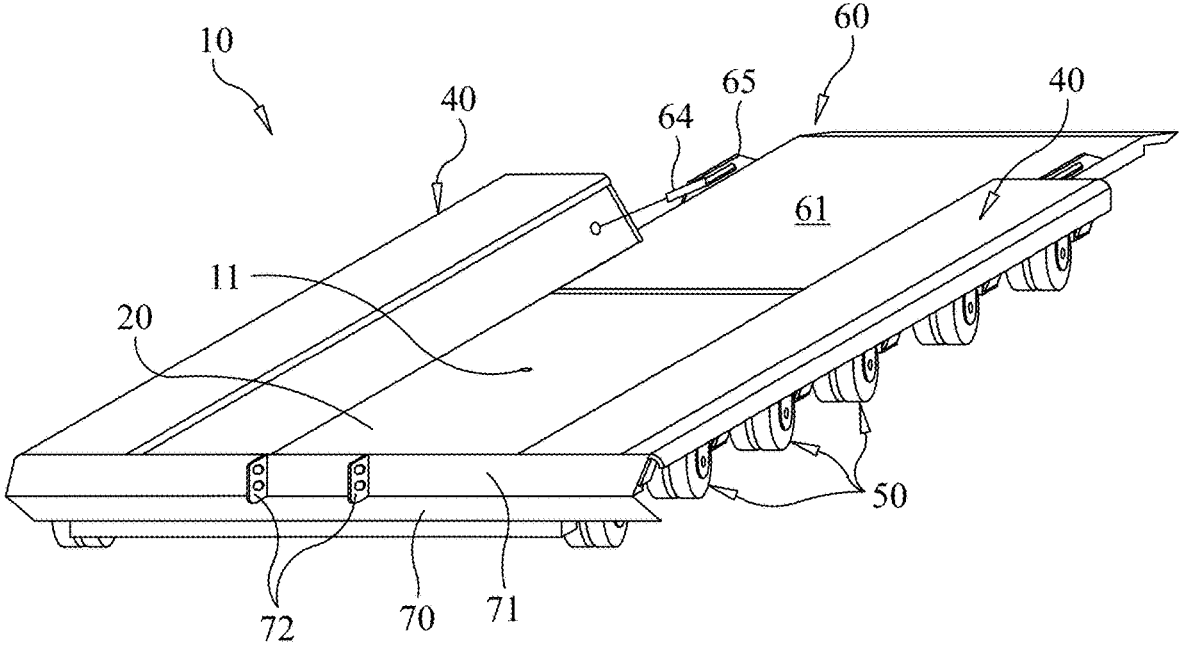
FIG. 5 is a perspective view of the aircraft dolly illustrated from the towing end thereof with its ramp connected to the dolly's plate in accordance with various aspects as described herein.
Figure 6:
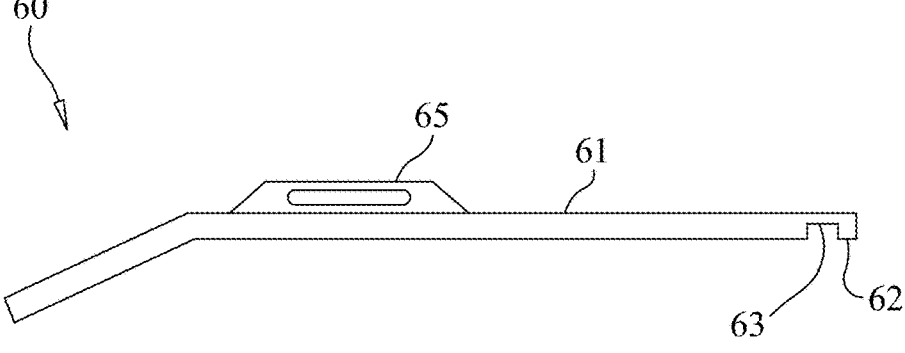
FIG. 6 is an isolated side view of an embodiment of the ramp.

End 22 of plate 20 may include a rectangular cutout 26 for receiving a substantial portion of ramp 60 when ramp 60 is coupled to plate 20. In some embodiments, a recessed ledge (not shown) may be provided at the edge of cutout 26 to allow the top surface 61 of ramp 60 to lie flush with the top surface of plate 20. To simplify and strengthen the coupling of ramp 60 to plate 20, a channel 27 may be formed in the top of plate 20 just inboard of cutout 26. Channel 27 extends perpendicular to each of sides 23 and 24. Referring additionally now to FIG. 6, one end of ramp 60 may have a tab 62 configured for engagement with channel 27 in plate 20. A recess 63 may be provided in the bottom of ramp 60 just inboard of tab 62. Recess 63 engages with the portion of plate 20 immediately outboard of channel 27 along cutout 26. In some embodiments, each side of ramp 60 is configured with a bracket 65 for the attachment of a gas strut 64 (FIGS. 4-5). The other end of each gas strut 64 is attached to one of side supports 40 as illustrated in FIG. 5. The inclusion of gas struts 64 aids in the raising/lowering of ramp 60. Locking pins (not shown) may be provided to secure ramp 60 in a desired raised or lowered position.

Figure 2:
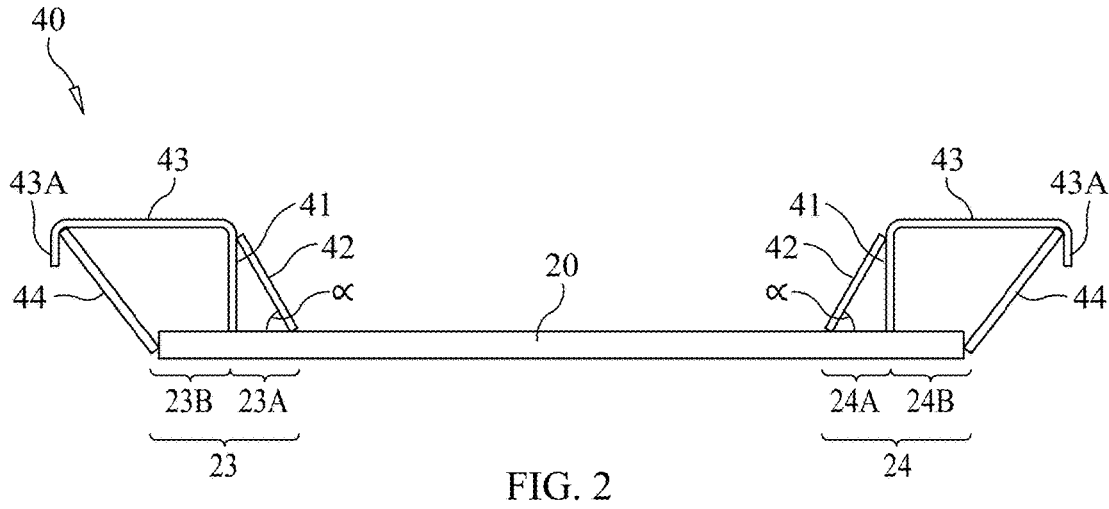
FIG. 2 is an isolated end view of the plate and one embodiment of side supports for an aircraft dolly in accordance with various aspects as described herein.

Each of supports 40 is a longitudinal structure disposed at and coupled to one of sides 23/24 of plate 20. In general, each of side supports 40 is a rigid assembly that is rigidly coupled to plate 20. For example, if plate 20 is metal, side supports 40 may also be made from metal and welded to plate 20. For clarity of illustration, any such rigid coupling (e.g., welds) of side supports 40 (to include the components thereof) to plate 20 are omitted from the figures. As best illustrated in FIG. 2, each of side supports 40 includes a vertical member 41, an inboard bracing member 42, a horizontal member 43, and a set of outboard bracing members 44. Each vertical member 41 and inboard bracing member 42 is rigidly coupled along one edge thereof to a respective one of side portions 23A/24A. Each inboard bracing member 42 is rigidly coupled to plate 20 inboard of its corresponding vertical member 41. Inboard bracing member 42 angles towards its corresponding vertical member 41 at an angle α made with plate 20 and is rigidly coupled to vertical member 41 all along its outboard edge that extends along plate 20. Angle α is generally in the range of 30° to 45°. As a result, each of side supports 40 includes a tube of triangular cross-section defined by vertical member 41, inboard bracing member 42, and the portion of plate 20 extending between vertical member 41 and inboard bracing member 42. The triangular tube provides a rigid base of support for each of side supports 40.

Each horizontal member 43 is rigidly coupled to and along the outer edge of vertical tube 42, i.e., along the top edge of the above-described triangular tube. Each horizontal member 43 extends over the corresponding fingers 23B/24B at sides 23/24. The outboard edge of each horizontal member 43 is supported by a corresponding outboard bracing member 44. Each outboard bracing member 44 is rigidly coupled to one of fingers 23B/24B and its corresponding horizontal member 43. In some embodiments, the outboard edge of horizontal member 43 may be finished with a down-turned lip 43A to capture the end of each outboard bracing member 44.

Figure 3:
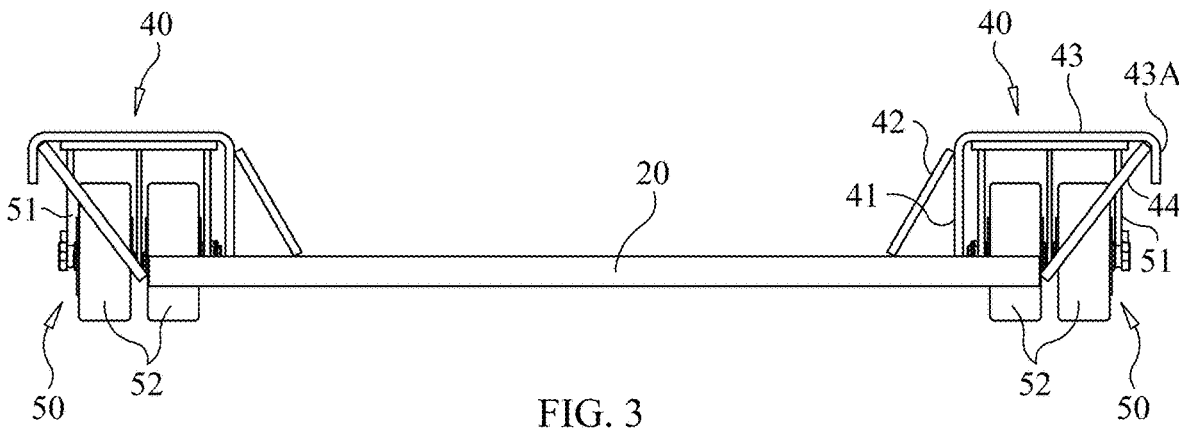
FIG. 3 is an isolated end view of the plate and side supports with casters coupled to the side supports for an aircraft dolly in accordance with various aspects as described herein.

As mentioned above, each of casters 50 is coupled to one of side supports 40 and disposed in one of cutouts 25 in plate 20. In general and as best illustrated in FIG. 3, each caster 50 includes a support frame 51 and one or more wheels 52 rotatably mounted to frame 51. Frame 51 is configured for attachment to horizontal member 43 of a side support 40. Attachment of frame 51 to horizontal member 43 may be made using bolts which are omitted from the drawings to maintain clarity in the illustrations. Since outboard bracing members 44 are only coupled to plate 20 at fingers 23B/24B, each of casters 50 is readily accessible at the sides of dolly 10 thereby simplifying the cleaning of debris from the casters, replacement of the casters, etc.

Figure 7:
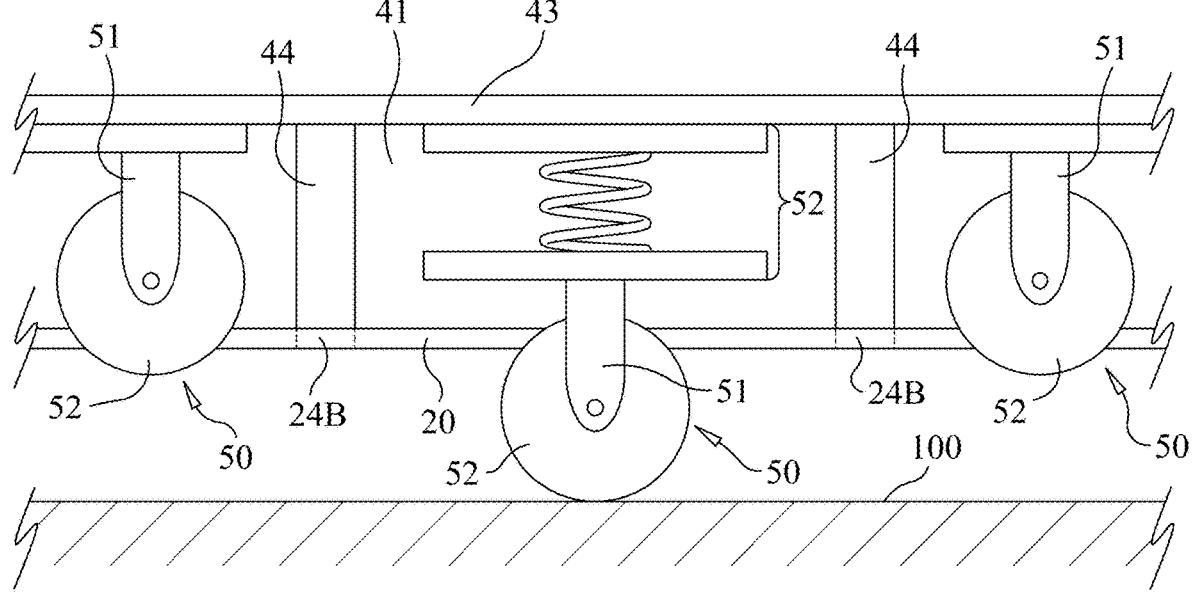
FIG. 7 is an isolated side view of one of the aircraft dolly's casters spring biased away from its side support in accordance with various aspects as described herein.

One caster 50 associated with each side support 40 is spring-biased away from the side support such that, when dolly 10 does not have an aircraft's landing gear positioned on the dolly's plate, the spring-bias raises the side supports thereby reducing the dolly's weight acting on the remaining casters. For example and as illustrated in FIG. 7, a compression spring assembly 52 is used to couple one caster 50 to horizontal member 43 of its corresponding side support. A second compression spring assembly is provided for another caster at the dolly's opposing side support. When plate 20 is not loaded by an aircraft's landing gear, compression spring assembly 52 causes horizontal member 43 to move up which, in turn, raises up plate 20 since horizontal member 43 is coupled to plate 20 by vertical member 41. As plate 20 moves up and away from a ground surface 100, adjacent casters 50 are similarly lifted up from ground surface 100. In some embodiments, the two spring-biased casters (i.e., one associated with each of side supports 40) may be disposed at positions that are approximately aligned with the center of gravity 11 (FIGS. 4-5) of dolly 10. In this way, an unloaded dolly 10 is readily manipulated over a ground surface as a user may teeter each of the dolly's towing end or loading end up or down as needed to move over a ground surface and any obstructions encountered during such maneuvering.

In some embodiments and as best illustrated in FIG. 5, the towing end of dolly 10 may have a skid plate 70 rigidly coupled to plate 20 to allow the dolly to be pulled over uneven surfaces. A tow-bar attachment plate 71 may be rigidly coupled to skid plate 70. One or more tow-bar attachment brackets 72 may be rigidly coupled to plate 71.

Figure 8:
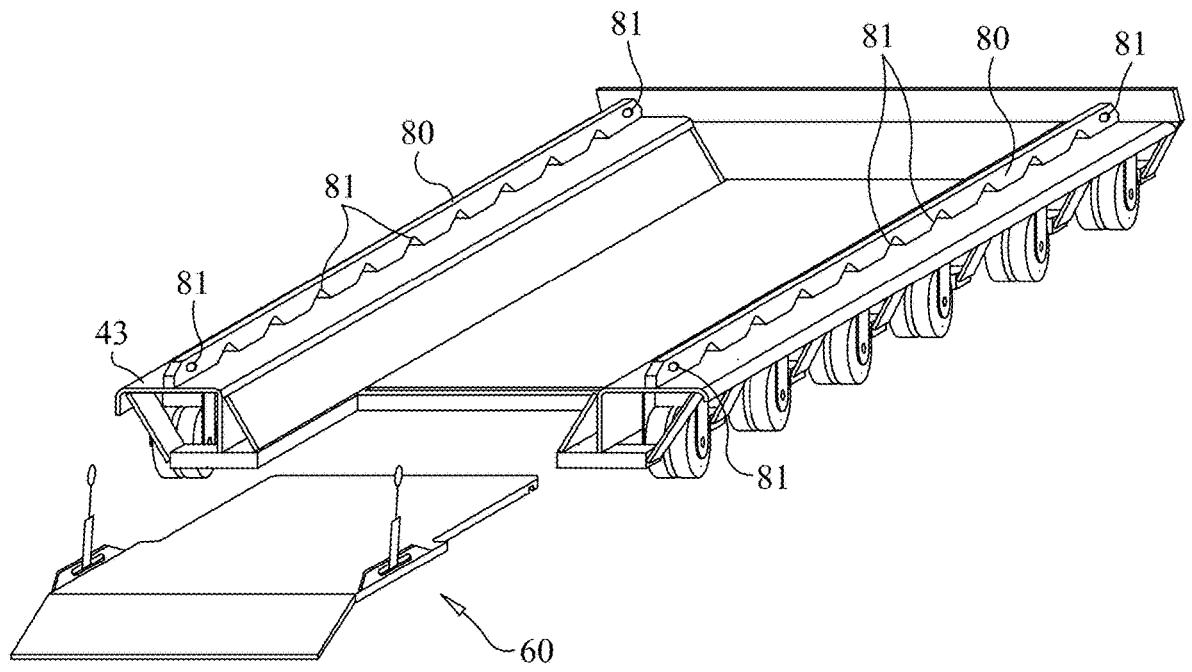
FIG. 8 is a perspective view of another embodiment of an aircraft dolly to include its ramp in accordance with various aspects as described herein.

In some embodiments, an aircraft dolly in accordance with the present disclosure may have additional features. For example and with reference to FIG. 8, a rigid bar 80 may be rigidly coupled to the top of each horizontal member 43 of each side support 40. Bar 80 may include a number of pass-through openings 81 (e.g., stand-alone holes or openings defined by cutouts in bar 80 abutting horizontal member 43) to accommodate attachment of tools (not shown). Such tools may include travel stops for a landing gear loaded on the dolly and tools used to aid in the unloading of a landing gear loaded on the dolly.

Figure 9:
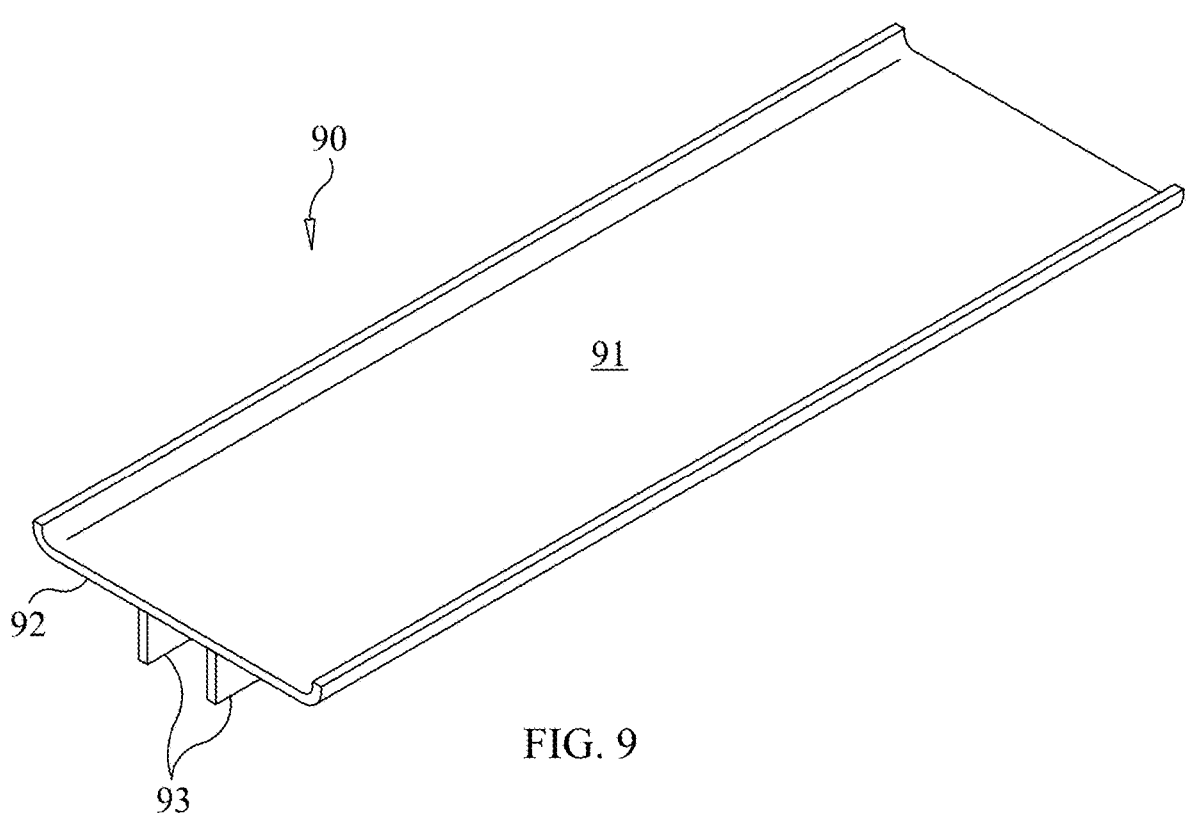
FIG. 9 is a perspective view of a stacking tray for disposition on each of an aircraft dolly's side supports in accordance with various aspects as described herein.

Each of bars 80 may also serve as points of engagement with a stacking tray (not shown in FIG. 8) used for the vertical storage of multiple aircraft dollies. For example and with reference to FIG. 9, a stacking tray 90 is a rigid tray having a top surface 91 and bottom surface 92. Disposed along the bottom surface 92 is a trough 93 sized for engagement with one of the above-described bars 80 and sized such that the outboard edges of trough 93 rest on a corresponding horizontal member 43 of a side support. In some embodiments, trough 93 is configured so that top surface 91 is parallel to plate 20 when tray 90 is engaged with a bar 80 on top of a dolly such that the placement of two trays 90 on a dolly provide for the stacking of another dolly on the two trays.

In some embodiments, a dolly "caboose" may be coupled to the loading end of the aircraft dolly having bars 80 (as described above) to support a larger landing gear. For such applications, the dolly caboose may be configured to include bars 80 such that joining of the caboose to the dolly may be accomplished using a simple connecting bar (not shown) pinned to an opening 81 on the dolly's bar 80 and to an opening on a corresponding bar mounted on the caboose.

Figures 10A, 10B:
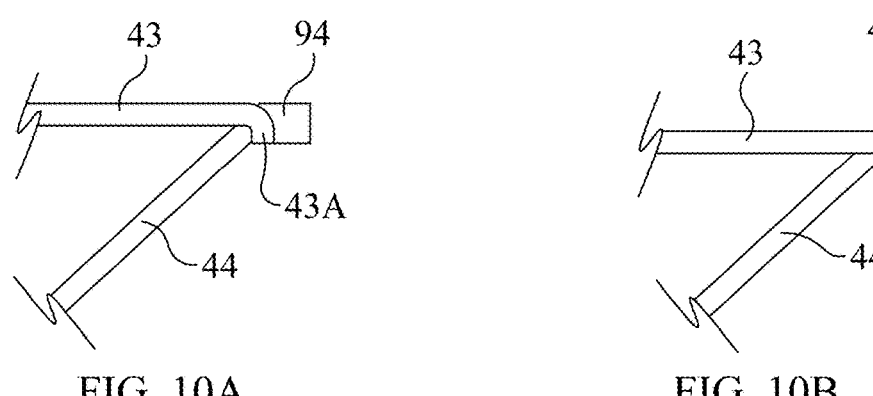
FIG. 10A is an isolated end view of an embodiment of a bumper coupled to aircraft dolly's side support in accordance with various aspects as described herein.
FIG. 10B is an isolated end view of another embodiment of a bumper coupled to aircraft dolly's side support in accordance with various aspects as described herein.
Figure 10C:
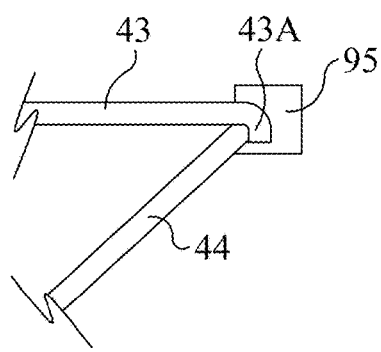
FIG. 10C is an isolated end view of another embodiment of a bumper coupled to aircraft dolly's side support in accordance with various aspects as described herein.

In some embodiments, shock absorbing bumpers may be coupled to each side support to protect objects that are bumped during maneuvering of a loaded or unloaded dolly. Several non-limiting bumper schemes are illustrated in FIGS. 10A-10C. In FIG. 10A, an elongate bumper 94 is attached to a downturned lip 43A of each horizontal member 43. In FIG. 10B, the elongate bumper 94 is shown attached all along an upturned lip 43B of a horizontal member 43. In FIG. 10C, a shaped bumper 95 is wrapped around a downturned lip 43A. Other bumper schemes may be used without departing from the scope of the present disclosure.

In use, an unloaded aircraft dolly as described herein is readily maneuvered to a desired location as the spring-biased casters allow the dolly to be teetered up/down about a line connecting the two spring-biased casters. Once in position at a landing gear, there are multiple ways to manipulate the aircraft to position the landing gear on the dolly. For example, if loading the nose portion of an aircraft and the nose (landing) gear associated therewith, the aircraft may be chocked and a tug connected to the dolly can push the dolly back under the nose gear. In some embodiments, the dolly may be chocked and a tug connected to the aircraft can pull the aircraft onto the dolly. These same procedures may be used for an aircraft's main landing gear. The above-described spring-biased casters may improve the loading/unloading process when an aircraft's landing gear is positioned solely on the dolly's ramp (i.e., initially during the loading process and at the end of the unloading process) as the dolly teeters down at the ramp coupling to thereby reduce the angle the ramp makes with the ground and moderate loading/unloading forces needed and acting on the landing gear.

The advantages of the aircraft dolly described herein are numerous. The aircraft dolly combines strength of construction, ease of maneuverability, and ease of maintenance to improve the movement of aircraft having damaged landing gears or aircraft that need to be moved in constrained areas.

Although the methods and systems presented herein have been described for specific embodiments thereof, there are numerous variations and modifications that will be readily apparent to those skilled in the art in light of the above teachings. It is therefore to be understood that, within the scope of the appended claims, the methods and systems presented herein may be practiced other than as specifically described.

What is claimed as new and desired to be secured by Letters Patent of the United States is:

1. A dolly for support of an aircraft's landing gear, comprising:

a rigid first plate lying in a single plane, said first plate including mirror-imaged sets of spaced-apart fingers at opposing longitudinal sides of said first plate and having a channel in a surface of said first plate wherein said channel is perpendicular to said sides;

a longitudinal rigid support disposed at each of said sides, each said support including a vertical member extending along and rigidly coupled directly to said first plate inboard of said fingers, said vertical member having an outboard edge, a first bracing member extending continuously along and rigidly coupled directly to said first plate inboard of said vertical member, said first bracing member rigidly coupled to said outboard edge of said vertical member, a horizontal member extending along and rigidly coupled directly to said outboard edge of said vertical member, said horizontal member extending over said fingers, and a set of second bracing members, each of said second bracing members rigidly coupled directly to one of said fingers and said horizontal member;

a set of casters coupled to each said support with each one of said casters disposed between two adjacent ones of said fingers;

one of said casters at each of said sides being spring-biased away from said support associated therewith; and a rigid second plate having a tab for engagement in said channel of said first plate, wherein said second plate includes an edge adapted to engage a ground surface.

2. The dolly of claim 1 wherein, for each said support, said first bracing member angles towards said horizontal member at an angle in a range of 30° to 45° with respect to said first plate.

3. The dolly of claim 1, wherein each said one of said casters is approximately located at a center of gravity of said dolly.

4. The dolly of claim 1, further comprising a set of gas struts wherein each of said gas struts is coupled to said second plate and one said support.

5. The dolly of claim 1, wherein each said support further includes a bar rigidly coupled to said horizontal member, said bar having openings distributed along a length of said bar.

6. The dolly of claim 5, further comprising a set of trays, each of said trays having a top surface, each of said trays operable to engage said bar wherein said top surface is parallel to said first plate.

7. The dolly of claim 1, further comprising a bumper coupled to each said support along said horizontal member associated therewith.

8. A dolly for support of an aircraft's landing gear, comprising:

a one-piece rigid and planar plate lying in a single plane, said plate including opposing mirror-imaged longitudinal planar sides, each of said planar sides including a first planar portion that is continuous and a second planar portion of spaced-apart fingers contiguous with said first planar portion;

a longitudinal rigid support disposed at each of said planar sides, each said support including a tube of triangular cross-section, said tube having a first leg extending along and rigidly coupled directly to said first planar portion of said plate, a second leg extending along and rigidly coupled directly to said first planar portion of said plate inboard of said first leg and rigidly coupled directly to said first leg, and a third leg consisting of said first planar portion extending between said first leg and said second leg, a horizontal member extending along and rigidly coupled to said tube, said horizontal member extending over said fingers, and a set of bracing members, each of said bracing members rigidly coupled directly to one of said fingers and said horizontal member;

a set of casters coupled to each said horizontal member with each one of said casters disposed between two adjacent ones of said fingers;

one of said casters at each of said sides being spring-biased away from said horizontal member associated therewith; and a rigid ramp operable to engage said plate, wherein said ramp includes an edge adapted to engage a ground surface.

9. The dolly of claim 8, further comprising:

a channel in a surface of said plate wherein said channel is perpendicular to said planar sides; and a tab on said ramp for engagement in said channel.

10. The dolly of claim 8 wherein, for each said support, said second leg angles towards said first leg at an angle in a range of 30° to 45° with respect to said plate.

11. The dolly of claim 8, wherein each said one of said casters is approximately located at a center of gravity of said dolly.

12. The dolly of claim 8, further comprising a set of gas struts wherein each of said gas struts is coupled to said ramp and one said support.

13. The dolly of claim 8, wherein each said support further includes a bar rigidly coupled to said horizontal member, said bar having openings distributed along a length of said bar.

14. The dolly of claim 13, further comprising a set of trays, each of said trays having a top surface, each of said trays operable to engage said bar wherein said top surface is parallel to said plate.

15. The dolly of claim 8, further comprising a bumper coupled to each said support along said horizontal member associated therewith.

16. A dolly for support of an aircraft's landing gear, comprising:

a one-piece rigid and planar plate lying in a single plane, said plate including opposing mirror-imaged longitudinal planar sides, each of said planar sides including a first planar portion that is continuous and a second planar portion of spaced-apart fingers contiguous with said first planar portion, said plate having a channel in a surface of said plate that is perpendicular to said planar sides;

a longitudinal rigid support disposed at each of said planar sides, each said support including a tube of triangular cross-section, said tube having a first leg extending along and rigidly coupled directly to said first planar portion of said plate, a second leg extending along and rigidly coupled directly to said first planar portion of said plate inboard of said first leg and rigidly coupled directly to said first leg, and a third leg consisting of said first planar portion extending between said first leg and said second leg, a horizontal member extending along and rigidly coupled to said tube, said horizontal member extending over said fingers, a bar rigidly coupled to said horizontal member, said bar having openings distributed along a length of said bar, and a set of bracing members, each of said bracing members rigidly coupled directly to one of said fingers and said horizontal member;

a set of casters coupled to each said horizontal member with each one of said casters disposed between two adjacent ones of said fingers;

one of said casters at each of said sides being spring-biased away from said horizontal member associated therewith; and a rigid ramp having a tab operable to engage said channel, said ramp including an edge adapted to engage a ground surface.

17. The dolly of claim 16 wherein, for each said support, said second leg angles towards said second leg at an angle in a range of 30° to 45° with respect to said plate.

18. The dolly of claim 16, wherein each said one of said casters is approximately located at a center of gravity of said dolly.

19. The dolly of claim 16, further comprising a set of gas struts wherein each of said gas struts is coupled to said ramp and one said support.

20. The dolly of claim 16, further comprising a set of trays, each of said trays having a top surface, each of said trays operable to engage said bar wherein said top surface is parallel to said plate.

21. The dolly of claim 16, further comprising a bumper coupled to each said support along said horizontal member associated therewith.

* * * * *